(12) United States Patent
Miller et al.

(10) Patent No.: US 8,905,197 B2
(45) Date of Patent: Dec. 9, 2014

(54) PASSIVE MAGNETIC ELEVATOR CAR STEADIER

(75) Inventors: Robin Mihekun Miller, Glastonbury, CT (US); Richard J. Ericson, Southington, CT (US)

(73) Assignee: Otis Elevator Company, Farmington, CT (US)

( * ) Notice: Subject to any disclaimer, the term of this patent is extended or adjusted under 35 U.S.C. 154(b) by 158 days.

(21) Appl. No.: 12/741,639

(22) PCT Filed: Nov. 30, 2007

(86) PCT No.: PCT/US2007/024618
§ 371 (c)(1),
(2), (4) Date: May 6, 2010

(87) PCT Pub. No.: WO2009/070141
PCT Pub. Date: Jun. 4, 2009

(65) Prior Publication Data
US 2010/0236872 A1    Sep. 23, 2010

(51) Int. Cl.
*B66B 11/02*    (2006.01)
*F16F 6/00*    (2006.01)
*F16F 15/03*    (2006.01)

(52) U.S. Cl.
CPC ............. *B66B 11/0273* (2013.01); *F16F 6/005* (2013.01)
USPC .......................................... 187/401; 187/292

(58) Field of Classification Search
CPC ..... B66B 7/044; B66B 11/0273; F16F 6/005; F16F 15/03
USPC ........................... 187/401, 409, 292, 393, 414
IPC ................... B66B 11/02,5/28, 7/04; F16F 6/00, F16F 15/03
See application file for complete search history.

(56) References Cited

U.S. PATENT DOCUMENTS 4,314,623 A * 2/1982 Kurokawa ..................... 188/267
4,899,852 A    2/1990 Salmon et al.
(Continued)

FOREIGN PATENT DOCUMENTS

AU    584067 B2    3/1985
AU    584067    5/1989
(Continued)

OTHER PUBLICATIONS

IPDL Patent & Utility Model Gazette Translation, JP 2007 217 089 A, Dec. 11, 2011, pp. 1-6.*

(Continued)

*Primary Examiner* — William A Rivera
*Assistant Examiner* — Stefan Kruer
(74) *Attorney, Agent, or Firm* — Cantor Colburn LLP

(57) ABSTRACT

A device (22) for damping vibrations between a first component (16) and a second component (14) includes a receiving member (24) configured to be connected to the first component (16), a first permanent magnet (26) arranged inside the receiving member (24), a second permanent magnet (28) arranged inside the receiving member (24) in series with the first magnet (26), and an engaging member (30) slidably connected to the receiving member (24) and including a first end configured to engage the second component (14) and a second end inside the receiving member (24) adjacent the first magnet (26). The second magnet (28) includes a pole which repels a facing pole of the first magnet (26).

26 Claims, 6 Drawing Sheets

(56) References Cited

U.S. PATENT DOCUMENTS

| | | | |
|---|---|---|---|
| 6,401,872 B1 * | 6/2002 | Morishita | 187/292 |
| 6,510,925 B1 * | 1/2003 | De Jong | 187/409 |
| 2006/0175150 A1 * | 8/2006 | Oh et al. | 187/409 |
| 2009/0173861 A1 * | 7/2009 | Ham | 248/309.4 |

FOREIGN PATENT DOCUMENTS

| | | | | |
|---|---|---|---|---|
| DE | 19840244 A1 | 3/2000 | | |
| EP | 1382468 A2 * | 1/2004 | | F16F 6/00 |
| JP | 583817 | 1/1883 | | |
| JP | 2175585 | 7/1990 | | |
| JP | 04034246 A | 2/1992 | | |
| JP | 7-145838 | 6/1995 | | |
| JP | 07215634 A * | 8/1995 | | B66B 11/02 |
| JP | 07301269 A | 11/1995 | | |
| JP | 8131480 A | 5/1996 | | |
| JP | 9184539 A | 7/1997 | | |
| JP | 3051758 | 6/1998 | | |
| JP | 11141602 A | 5/1999 | | |
| JP | 2001165239 A | 6/2001 | | |
| JP | 2002274769 A | 9/2002 | | |
| JP | 2007046287 A | 2/2007 | | |
| JP | 2007217089 A | 8/2007 | | |

OTHER PUBLICATIONS

International Search Report, mailed Jul. 25, 2008.
The English translation of the Office Action dated Apr. 12, 2012 for Japanese Patent Application No. 2010-535933.
The European Search Report dated Jul. 5, 2012 for European Application No. 12170592.5.
English Translation of Chinese Search Report, dated Apr. 16, 2013.
English Translation of Chinese Third Office Action, dated Apr. 24, 2013.
Japanese Office Action, mailed Mar. 6, 2013.
The translation from the Dec. 21, 2012 Chinese Second Office Action for Chinese Paten Application No. 200780101739.

* cited by examiner

PASSIVE MAGNETIC ELEVATOR CAR STEADIER

BACKGROUND

The present invention relates to damping vibrations between first and second components. More particularly, the invention relates to a permanent magnet damper configured to dampen vibrations transmitted to an elevator car from guide rails on which the car rides.

A typical elevator system includes an elevator car and a counterweight, each suspended on distal points on hoist ropes in an elevator hoistway. In some systems, the elevator car is attached to a car frame to which the hoist ropes are attached. The elevator system also includes guide rails extending the length of the hoistway and attached to opposite sides of the hoistway. A group of roller guides are attached to the elevator car or car frame and guide the car or frame up and down the hoistway along the guide rails.

There are several factors that impact the quality of the elevator car ride in elevator systems. One such factor is the total length of the hoistway. Longer hoistways require a greater number of guide rail segments stacked within the hoistway and a greater number of joints between the guide rail segments. A greater number of guide rail segments results in greater total weight of the guide rails. The increased weight of the guide rail segments causes the rails to deflect in the hoistway. Also, the joints between the guide rail segments result in discontinuities at the joints. Even slightly deflected rails and minimal discontinuity in joints cause an ascending or descending elevator car to vibrate and move laterally.

To minimize the adverse impact of rail imperfections on the ride quality of the elevator car, roller guide assemblies commonly include a suspension system and a damping system. However, prior roller guide assemblies have struggled with balancing the stiffness required for damping and the cushion required for suspension. In addition to roller guide suspension and damping, prior elevator systems have commonly employed crude rubber bumpers arranged between, for example, the frame and the car to steady the car during operation. These bumpers are often mounted and adjusted incorrectly, leading to increased vibration in the elevator car. The material properties of the bumpers degrade over time and therefore necessitate relatively frequent replacement. Finally, the bumpers transmit vibrations, for example from the car frame to the car, which excites other components thereby generating additional noise in the system.

Prior elevator systems have also employed electromagnetic couplers to reduce the impact of guide rail imperfections on the ride quality of the elevator car. However, electromagnetic couplers have several disadvantages. Electromagnetic couplers are subject to failure when the power source driving the electromagnets included in such couplers fails. Electromagnetic couplers consume extra electric energy during operation and increase the mass added to elevator systems employing such couplers. In addition, electromagnetic couplers are very costly, practically prohibiting their use in commercial elevator systems applications.

In addition to active solutions such as the electromagnetic coupler, elevator systems including passive non-contacting permanent magnet couplers have been proposed. One such coupler is described in PCT International Application No. US2007/002433, entitled "Permanent Magnet Noise Isolator." Non-contacting magnetic couplers, such as described in PCT US2007/002433, may be employed to physically isolate the elevator car from vibrations caused by guide rail imperfections. The magnetic couplers include groups of repelling magnet pairs arranged to form a coupling between, for example, the elevator car and the car frame or the car frame and the roller guides.

In light of the foregoing, the present invention aims to resolve one or more of the aforementioned issues that afflict elevator systems.

SUMMARY

A device for damping vibrations between a first component and a second component includes a receiving member configured to be connected to the first component, a first permanent magnet arranged inside the receiving member, a second permanent magnet arranged inside the receiving member in series with the first magnet, and an engaging member slidably connected to the receiving member and including a first end configured to engage the second component and a second end inside the receiving member adjacent the first magnet. The second magnet includes a pole which repels a facing pole of the first magnet.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are hereafter briefly described.

DETAILED DESCRIPTION

Figure 1:
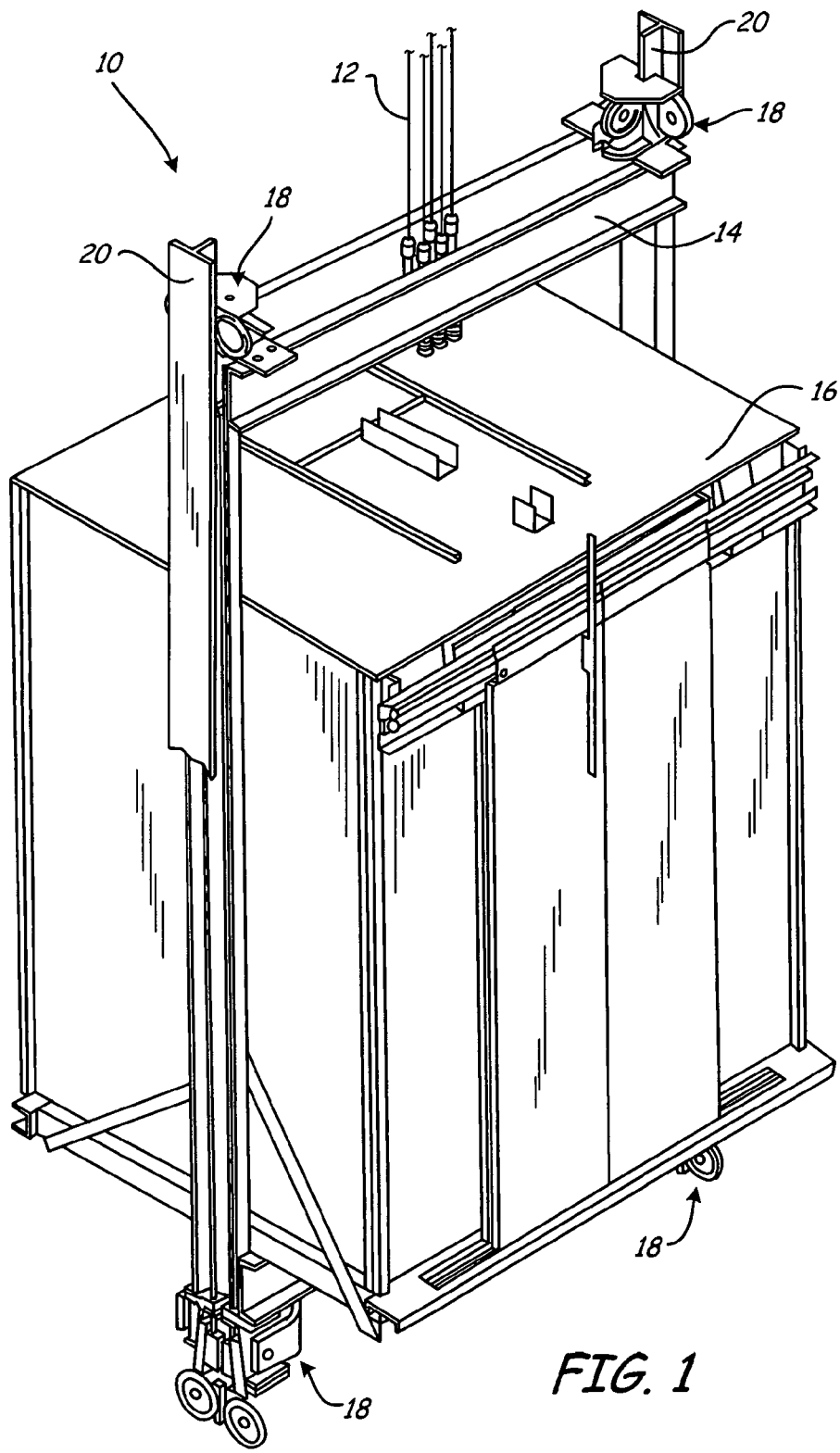
FIG. 1 shows an elevator system.

Efforts have been made throughout the drawings to use the same or similar reference numerals for the same or like components.

FIG. 1 shows an elevator system 10, which includes traction members (e.g., cables, as shown, or alternatively belts) 12, a car frame 14, a car 16, roller guides 18, and guide rails 20. The cables 12 are connected to the car frame 14 and a counterweight (not shown) inside a hoistway. The car 16, which is attached to the car frame 14, moves up and down the hoistway by force transmitted through the cables 12 to the car frame 14. The roller guides 18 are attached to the car frame 14 and guide the car frame 14 and the car 16 up and down the hoistway along the guide rails 20.

Imperfections in the guide rails 20 may affect ride quality by causing the car frame 14, and thereby the car 16, to vibrate and move inside the hoistway. There are several factors that impact the ride quality of the car 16. As previously discussed, two factors are: (a) the total length of the hoistway, which directly correlates to the potential for the segments of the guide rails 20 to deflect; and (b) the potential for discontinuities in the joints between the segments of the guide rails 20. Even slightly deflected and discontinuous guide rails 20 cause vibrations or noise, which may be transmitted through the roller guides 18 and the car frame 14 to the car 16.

Figure 2:
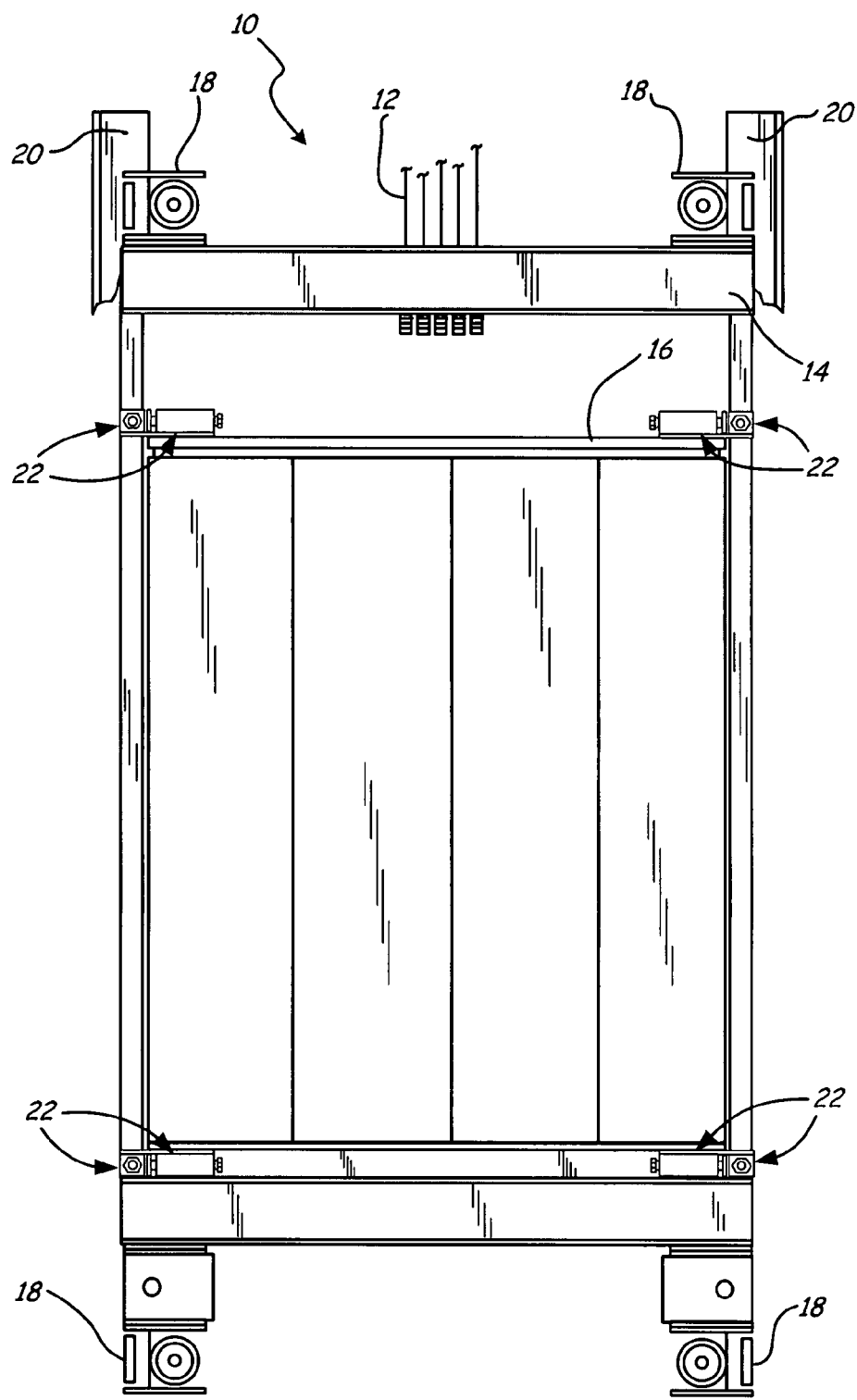
FIG. 2 shows an elevator system including an embodiment of a permanent magnet damper according to the present invention.

FIG. 2 shows an elevator system 10 including one embodiment of permanent magnet damper 22 according to the present invention. In FIG. 2, elevator system 10 includes the car frame 14, the car 16, the roller guides 18, the guide rails 20, and twelve permanent magnet dampers 22 (eight of which are shown in FIG. 2). The dampers 22 may be connected to the top and bottom of the car 16 adjacent the car frame 14. The dampers 22 connected to the top of the car 16 may include, for example, two sets of three dampers 22 located at the two junctions between the car frame 14 and the top of the car 16. Each damper 22 is positioned to counteract against another damper 22 with which it is aligned, thereby defining a damper pair. In the shown embodiment, for the dampers 22 provided at the top of the car 16, a first pair of dampers is provided in a first of the two sets of three dampers 22, a second pair of dampers is provided in the second of the two sets of three dampers 22, and a third pair of dampers is defined by one damper 22 provided in the first set of three dampers 22 and one damper 22 provided in the second set of three dampers 22.

Figure 3:
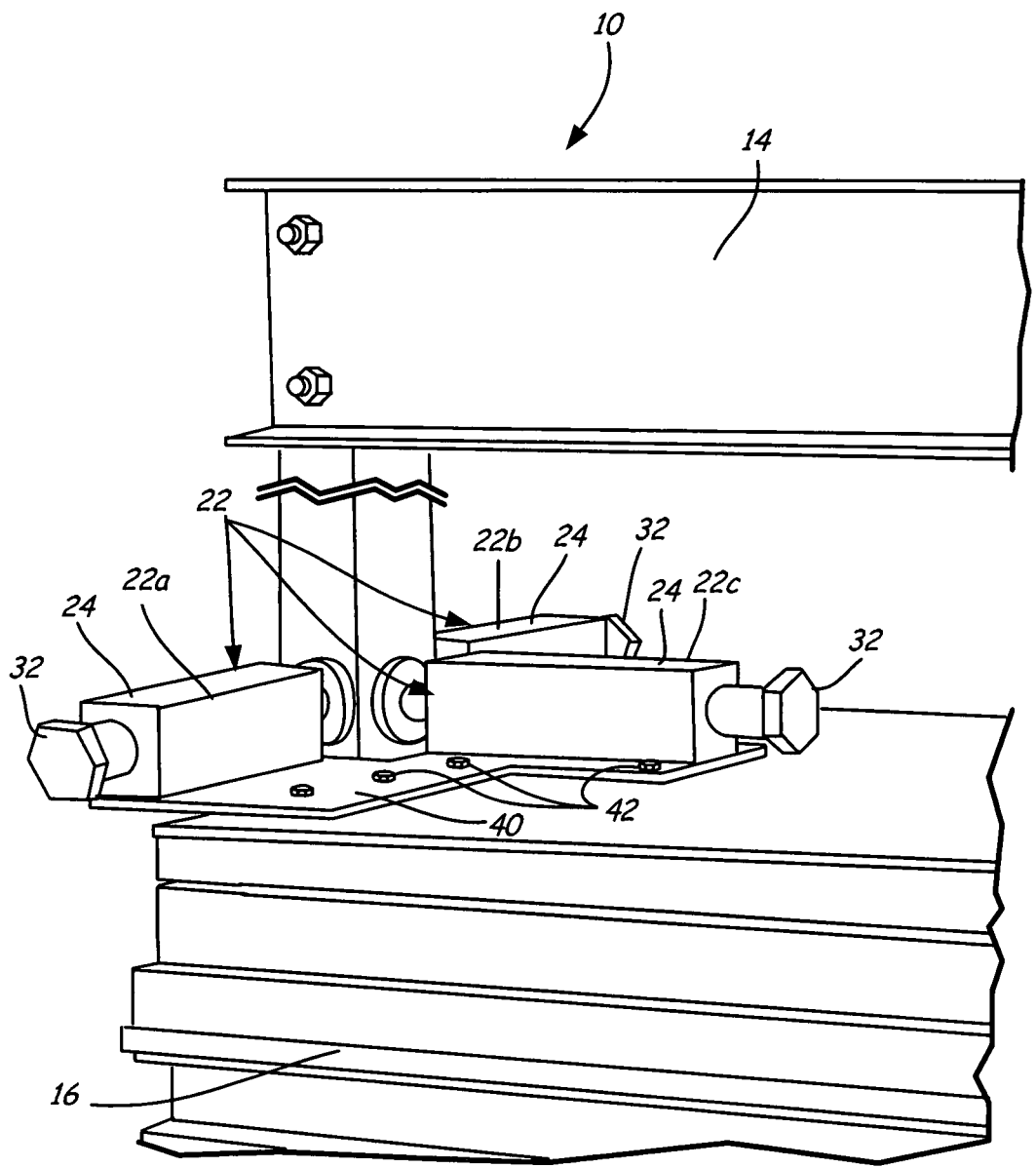
FIG. 3 is a detail perspective view of a set of the dampers shown in FIG. 2 arranged at a junction between the car frame and the top of the car.

FIG. 3 is a detail perspective view of one set of three dampers 22 arranged at one junction between the top of the car frame 14 and the top of the car 16. This set of dampers 22 includes one damper pair 22a, 22b; the other damper 22c is paired with a damper in another set of dampers 22. Each pair of dampers 22, for example the dampers 22a and 22b shown in FIG. 3, may be arranged in opposition to dampen vibrations between, for example, the car frame 14 and the car 16 in two directions in one dimension (e.g., forward/backward directions, side-to-side directions, and/or up-and-down directions). Referring again to FIG. 2, the dampers 22 may be configured to dampen vibrations caused by imperfections in the guide rails 20 and transmitted from the roller guides 18 to the car frame 14, and from the car frame 14 to the car 16. By arranging the dampers 22 between the car 16 and the guide rails 20, in this embodiment at the four connections between the car frame 14 and the car 16, the car 16 may be substantially isolated from disturbances caused by the guide rails 20. For example, in the elevator system 10 shown in FIG. 2, imperfections in the guide rails 20 caused by slight deflections or discontinuities cause the roller guides 18, and thereby the frame 14 to deflect or vibrate as the guides 18, the frame 14, and the car 16 ride along the guide rails 20. However, the car 16 may be substantially unaffected by such imperfections in the guide rails 20, because the dampers 22 between the car frame 14 and the car 16 may act to substantially absorb the vibrations caused by the guide rails 20 before reaching the car 16.

Figure 4:
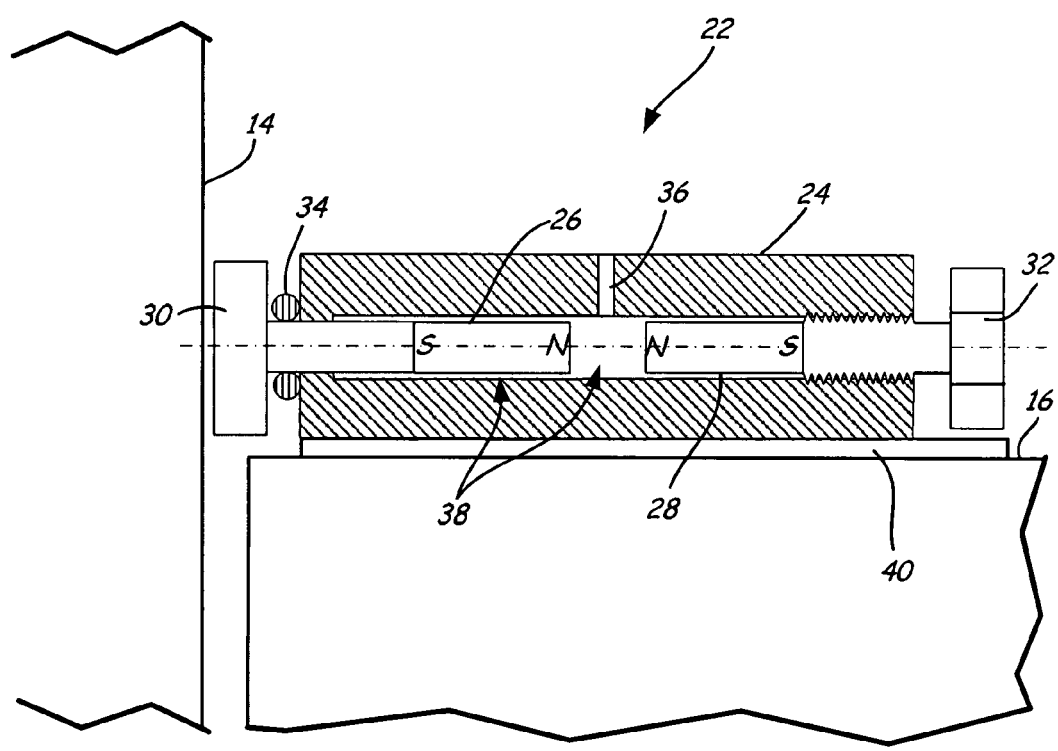
FIG. 4 is a section view of one embodiment of the permanent magnet damper shown in FIGS. 2 and 3.

FIG. 4 is a section view of one embodiment of the permanent magnet damper 22, which includes a receiving member in the form of a sleeve 24, a first magnet 26, a second magnet 28, an engaging member such as a plunger 30 journalled in the sleeve 24, a threaded member such as a bolt 32 and a buffer such as an O-ring 34. The damper 22 is either fastened to a base 40 or integrally formed along with the base 40. As shown in FIG. 3, the base 40 and, therefore, the damper 22 may be connected (by fasteners 42 such as bolts) to a first component, for example the car 16, adjacent to a second component, for example the car frame 14, and may be configured to dampen vibrations between the car 16 and the car frame 14. The first magnet 26 may be arranged inside the sleeve 24 with one end adjacent the plunger 30 and another end facing the second magnet 28. The second magnet 28 may be arranged inside the sleeve 24 in series with the first magnet 26 with one end adjacent the bolt 32 and another end facing the first magnet 26. The bolt 32 may be replaced with, for example, a set screw in alternative embodiments of the present invention. The first and second magnets 26, 28 may be, for example, generally cylindrical. The facing ends of the first and second magnets 26, 28 include repelling magnetic poles. In FIG. 4, for example, a north ("N") pole of the first magnet 26 is facing a north ("N") pole of the second magnet 28. In another embodiment of the damper 22, a south ("S") pole of the first magnet 26 may be arranged facing a south ("S") pole of the second magnet 28. The plunger 30 is slidably connected to the sleeve 24 adjacent the first magnet 26. In some embodiments of the present invention, the plunger 30 may be made from an engineering plastic. For example, the plunger 30 may be made from a nylon and molybdenum disulphide (MoS2) composition like Nylatron produced by Quadrant Engineering Plastic Products located in Reading, Pa. or an acetal resin like Delrin produced by E. I. du Pont de Nemours and Company located in Wilmington, Del. The bolt 32 is adjustably connected to the sleeve 24 adjacent the second magnet 28. The bolt 32 may be configured to easily adjust the spacing between the first and second magnets 26, 28. Moreover, although not shown, a locking mechanism may be provided to prevent the bolt 32 from being backed-out of the sleeve 24 due to the repulsive force between the first and second magnets 26, 28.

In operation, vibrations and deflections of the car frame 14 cause the car frame 14 to engage the plunger 30 of the damper 22. The damper 22 dampens the vibrations and deflections as motion of the plunger 30 into the sleeve 24 is resisted by the repelling magnetic fields of the first and second magnets 26, 28. The repulsive force of the magnetic fields from the first and second magnets 26, 28 is proportional to the distance between the magnets, thereby increasing the damping effect of the damper 22 as the plunger 30 is pushed further into the sleeve 24.

Figure 5:
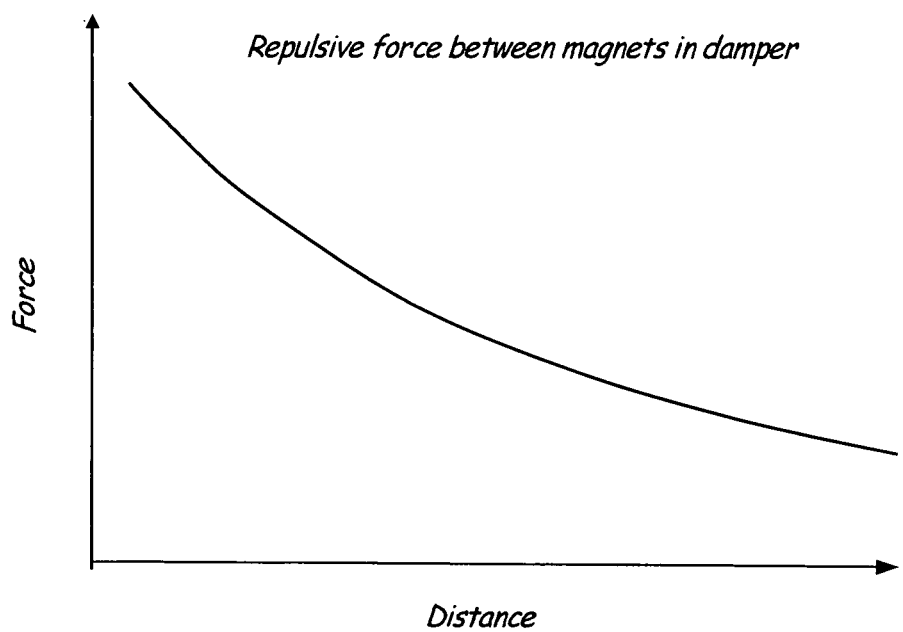
FIG. 5 is a graph of the repulsive force of the permanent magnets in a damper similar to the permanent magnet damper of FIGS. 2-4 versus the distance between the magnets.

Additionally, in embodiments in which the sleeve 24 is electrically conductive, the motion of the first magnet 26 may act to induce an eddy electrical current in the electrically conductive sleeve 24. Electrical current induced in the sleeve 24 may in turn generate its own magnetic field that may combine with the magnetic field of the first magnet 26, thereby increasing the damping effect of the damper 22 as the plunger 30 continues to push the first magnet 26 toward the second magnet 28. Therefore, the repulsive force of the damper 22 may increase exponentially as the first magnet 26 is pushed by the plunger 30 toward the second magnet 28 inside the sleeve 24. FIG. 5 illustrates the cumulative effect of magnetic fields produced in the sleeve 24. Specifically, FIG. 5 depicts a graph of the repulsive force of the first and second magnets 26, 28 (y-axis) versus the distance between the first and second magnets 26, 28 inside the sleeve 24 (x-axis).

In FIG. 4, the first magnet 26, second magnet 28, and plunger 30 may have an air barrier 38 between and surrounding them inside the sleeve 24 that contributes to the damping strength of the damper 22. The pneumatic damping created by the air barrier 38 inside the sleeve 24 may be adjusted by changing the size of the cavity housing the first and second magnets 26, 28 and/or by adding one or more holes between the exterior and interior of the sleeve 24. For example, in FIG. 4 sleeve 24 includes hole 36 with a first opening on an inside surface of the sleeve 24 and a second opening on an outside surface of the sleeve 24. The damper 22 may also include the O-ring 34 configured to physically limit the travel of the plunger 30. The O-ring 34 may be, as shown in FIG. 4, arranged around a shank of the plunger 30 between a head of the plunger 20 and an end of the sleeve 24. Alternatively or additionally, an O-ring may be arranged inside the sleeve 24 between the first and second magnets 26, 28.

Although FIG. 4 shows an embodiment of the damper 22 including two permanent magnets (26, 28), embodiments of the damper 22 may include one or more additional permanent magnets arranged in series with the first and second magnets 26, 28 and adapted to adjust the damping strength of the permanent magnet damper 22. In embodiments including more than two permanent magnets (26, 28) in series inside the sleeve 24, the magnets may be arranged such that facing ends of each magnet pair have repelling magnetic poles. For example, one embodiment of the damper 22 may include three permanent magnets arranged in series with the north pole of the first magnet facing the north pole of the second magnet and the south pole of the second magnet facing the south pole of the third magnet, therefore, the three magnets are arranged with a repelling pole configuration of (S—N)(N—S)(S—N). Similarly, another embodiment of the damper 22 may include three permanent magnets arranged in series with the south pole of the first magnet facing the south pole of the second magnet and the north pole of the second magnet facing the north pole of the third magnet, therefore, the three magnets are arranged with a repelling pole configuration of (N—S)(S—N)(N—S).

A variety of permanent magnets may be appropriate for use in permanent magnet dampers according to the present invention. Permanent magnets are readily available and come in a variety of shapes, sizes, and strengths. For example, a rare-earth magnet such as a neodymium magnet is appropriate for use in embodiments of the present invention. Neodymium magnets are made of a combination of neodymium, iron, and boron (NdFeB) and are commercially available in cylinder, wafer, ring, ball, and tube shapes as well as in many other shapes. Where appropriate and depending-on the intended application, a variety of other types of permanent magnets, including samarium-cobalt, may be used in permanent magnet dampers according to the present invention.

Permanent magnet dampers according to the present invention may be adapted to applications outside the elevator industry. For example, embodiments of the present invention may be adapted to dampen vibrations between two components in an automobile. Furthermore, embodiments of the present invention similar to the damper 22 shown in FIGS. 2-4 may function as a shock absorber by being configured to absorb low frequency and high amplitude vibrations between two components.

Figure 6:
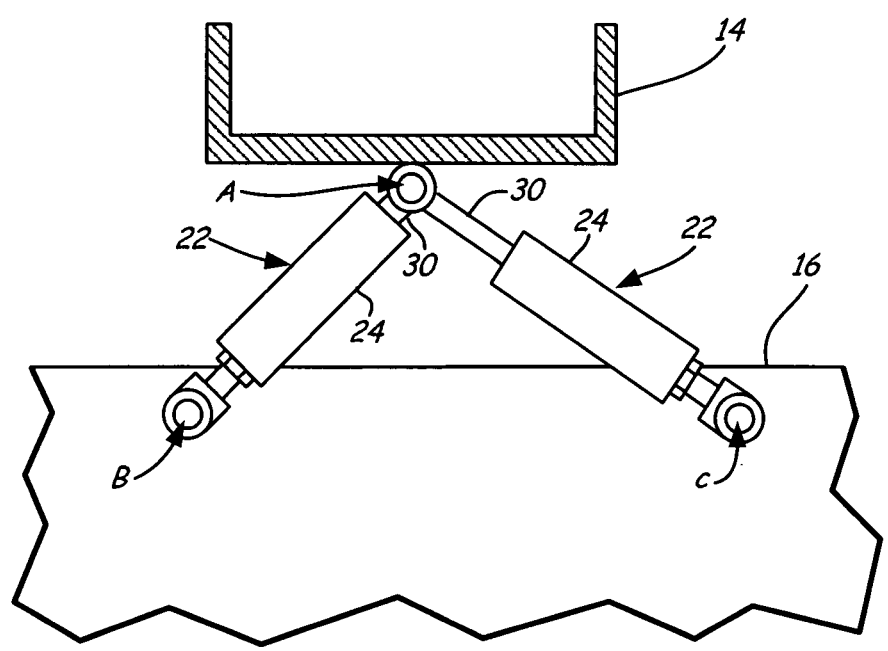
FIG. 6 is a detail top view of an alternative embodiment of the present invention in which the number and arrangement of the permanent magnet dampers in the elevator system is modified.

FIG. 6 is a detail top view of an alternative embodiment of the present invention in which the number and arrangement of the dampers 22 in the elevator system 10 is modified. In the embodiment of FIG. 6, elevator system 10 includes the frame 14, the car 16, and eight dampers 22 connected between the car 16 and the frame 14. In comparison to the embodiment of FIGS. 2-4, each of the four junctions (one of which is shown in FIG. 6) includes two rather than three dampers 22. Additionally, the plunger 30 of each damper 22 is connected to, as opposed to arranged adjacent to and engaging, the frame 14. Specifically, the two dampers 22 at each junction are arranged between the frame 14 and the car 16 with a common rotatable connection A between the plungers 30 and the frame 14, and separate rotatable connections B, C between the car 16 and ends of the sleeves 24 opposite the common rotatable connection A. The common rotatable connection A between the frame 14 and the plungers 30 of the two dampers 22 may be, for example, a shackle connected to the frame 14 and a clevis pin rotatably connecting the two dampers 22 to the shackle.

Embodiments of permanent magnet dampers according to the present invention and elevator systems including such dampers provide several advantages over prior methods and apparatuses for improving the ride quality in elevator cars. Embodiments of permanent magnet dampers according to the present invention may be arranged between two components to substantially absorb vibrations between the two components. For example, the dampers may be arranged between two elevator system components between the elevator car and the guide rails and may be configured to dampen vibrations caused by the guide rails before the vibrations reach the elevator car. Further, in embodiments in which the permanent magnets are arranged in series, the system is not only entirely passive, it also acts directly and instantly to an applied load, i.e., if one element (e.g., the car frame) is exposed to a sudden large vibration, the permanent magnet system greatly inhibits the vibration from being passed to a second element (e.g., car) by generating a correspondingly large level of damping.

Embodiments of the present invention including cylindrical permanent magnets arranged in series are less complex and costly than active solutions such as prior electromagnetic devices and in some applications display greater stability than prior passive magnetic arrangements. Furthermore, in elevator system applications, setup of the car and the dampers may be improved. The car may be first mounted on its load weighing devices, and then the magnetic dampers may be released and adjusted for proper separation between the car and the frame. Misalignment of the car or imbalance of the loading results in a clear visual indicator. The car position with respect to the frame may be quickly adjusted, for example, by adjusting the bolts included in the dampers.

The aforementioned discussion is intended to be merely illustrative of the present invention and should not be construed as limiting the appended claims to any particular embodiment or group of embodiments. For example, embodiments of permanent magnet dampers according to the present invention include modifications adapted to change the characteristics of the damper, such as changing the conductivity of the material of the sleeve, varying the thickness of the sleeve or the size of the cavity in which the magnets are housed, changing the size, shape, and number of magnets, changing the size of the air barrier and the hole in the sleeve, and changing the shape of the buffer from an O-ring to a substantially cylindrical resilient member. Thus, while the present invention has been described in particular detail with reference to specific exemplary embodiments thereof, it should also be appreciated that numerous modifications and changes may be made thereto without departing from the broader and intended scope of the invention as set forth in the claims that follow.

The specification and drawings are accordingly to be regarded in an illustrative manner and are not intended to limit the scope of the appended claims. In light of the foregoing disclosure of the present invention, one versed in the art would appreciate that there may be other embodiments and modifications within the scope of the present invention. Accordingly, all modifications attainable by one versed in the art from the present disclosure within the scope of the present invention are to be included as further embodiments of the present invention. The scope of the present invention is to be defined as set forth in the following claims.

The invention claimed is:

1. An elevator system, the system comprising:
   a car;
   a car frame connected to the car; and
   at least six pairs permanent magnet dampers arranged to dampen movement of the car relative to the car frame, at least three of the pairs of the permanent magnet dampers positioned proximate a top of the car, and at least three of the pairs of the permanent magnet dampers positioned proximate a bottom of the car, wherein each of the permanent magnet dampers comprises:
   a receiving member connected to one of the car or the car frame;
   an engaging member slidably connected to the receiving member at a first end, and configured to engage the other of the car or the car frame at a second end;
   a first permanent magnet arranged inside the receiving member; and
   a second permanent magnet slidably arranged inside the receiving member in series with the first magnet,
   the first permanent magnet and the second permanent magnet positioned within the receiving member such that a pole of the first permanent magnet is adjacent a similar pole of the second permanent magnet to form a repulsive force between the first permanent magnet and the second permanent magnet, and
   the second permanent magnet further positioned in the receiving member such that a dissimilar pole of the second magnet is located adjacent the first end of the engaging member;
   wherein the first end of the engaging member contacts the dissimilar pole of the second permanent magnet, and the repulsive force thereby biases the engaging member towards the other of the car or the car frame; and
   wherein each of the at least six pairs of permanent magnet dampers comprises a first permanent magnet damper configured to resist movement in a first direction and a second permanent magnet damper configured to resist movement in a second direction opposite the first direction.

2. The system of claim 1, wherein the receiving member is a sleeve and the engaging member is a plunger journalled in the sleeve.

3. The system of claim 2,
   wherein an end of the sleeve opposite the plunger is rotatably connected to the car; and
   wherein the first end of the plunger is rotatably connected to the frame.

4. The system of claim 2, wherein each of the plurality of permanent magnet dampers further comprises a threaded member adjustably connected to the sleeve opposite to the plunger and including an end inside the sleeve adjacent the second magnet.

5. The system of claim 4, wherein the end of the threaded member is connected to the second magnet.

6. The system of claim 2,
   wherein each of the permanent magnet dampers further comprises an Oring configured to limit the movement of the plunger with respect to the sleeve, and
   wherein the O-ring is arranged around a shank of the plunger between a head of the plunger and an end of the sleeve to which the plunger is slidably connected.

7. The system of claim 2, wherein the sleeve comprises at least one orifice with a first opening on an inside surface of the sleeve and a second opening on an outside surface of the sleeve.

8. The system of claim 1, wherein each of the plurality of permanent magnet dampers further comprises a buffer configured to limit the movement of the engaging member with respect to the receiving member.

9. The system of claim 8, wherein the buffer is an O-ring.

10. The system of claim 1, further comprising:
    at least one guide connected to the car frame, wherein the permanent magnet dampers are configured to dampen vibrations between the car and the at least one guide.

11. The system of claim 1, wherein each of the permanent magnet dampers further comprises one or more additional permanent magnets arranged in series with the first and second magnets inside the receiving member.

12. The system of claim 1, wherein the receiving member is formed of an electrically conductive material such that when either or both of the magnet(s) move within the receiving member, an eddy electrical current is generated.

13. The system of claim 1, wherein at least one of the first and second magnets is generally cylindrical.

14. A device for damping vibrations between a first component and a second component, the device comprising:
    a plurality of permanent magnet dampers arranged to dampen movement of the car relative to the car frame, wherein each of the magnet dampers comprise:
    a receiving member configured to be connected to the first component;
    a first permanent magnet arranged inside the receiving member;
    a second permanent magnet arranged inside the receiving member in series with the first magnet, wherein the second magnet includes a pole which repels a facing pole of the first magnet; and
    an engaging member slidably connected to the receiving member and comprising:
    a first end configured to engage the second component; and
    a second end inside the receiving member adjacent the first magnet;
    the first permanent magnet and the second permanent magnet positioned within the receiving member such that a pole of the first permanent magnet is adjacent a similar pole of the second permanent magnet to form a repulsive force between the first permanent magnet and the second permanent magnet, and
    the second permanent magnet further positioned in the receiving member such that a dissimilar pole of the second magnet is located adjacent a first end of the engaging member;
    wherein the first end of the engaging member contacts the dissimilar pole of the second permanent magnet, and the repulsive force thereby biases the engaging member towards the other of the first or second component; and
    wherein each of the plurality of permanent magnet dampers comprises a first permanent magnet damper configured to resist movement in a first direction and a second permanent magnet damper configured to resist movement in a second direction opposite the first direction.

15. The device of claim 14, further comprising a buffer configured to limit the movement of the engaging member with respect to the receiving member.

16. The device of claim 15, wherein the buffer is an O-ring.

17. The device of claim 14, wherein the receiving member is a sleeve and the engaging member is a plunger.

18. The device of claim 17, further comprising:
    an O-ring configured to limit the movement of the plunger with respect to the sleeve, wherein the O-ring is arranged around a shank of the plunger between a head of the plunger and an end of the sleeve to which the plunger is slidably connected.

19. The device of claim 14, further comprising one or more additional permanent magnets arranged in series with the first and second magnets inside the receiving member.

20. The device of claim 14, wherein an end of the receiving member opposite the engaging member is configured to be rotatably connected to the first component; and wherein the first end of the engaging member is configured to be rotatably connected to the second component.

21. The device of claim 14, further comprising a threaded member adjustably connected to the receiving member opposite to the engaging member and including an end inside the receiving member adjacent the second magnet.

22. The device of claim 14, wherein the receiving member is formed of an electrically conductive material such that when either or both of the magnet(s) move within the receiving member, an eddy electrical current is generated.

23. The device of claim 14, wherein at least one of the first and second magnets is generally cylindrical.

24. An elevator system, the system comprising:
a car;
a car frame connected to the car; and
a plurality of passive vibration dampeners arranged to dampen movement of the car relative to the car frame, wherein each of the passive vibration dampeners comprises:
 a receiving member having a first end and a second end;
 a first magnet, having a two opposite poles, positioned inside the receiving member near the first end of the receiving member;
 an engagement member, partially and slidably positioned in the receiving member near the second end of the receiving member;
 a second permanent magnet, having two opposite poles, slidably positioned inside the receiving member between the first permanent magnet and the engagement member, such that a pole of the first permanent magnet is positioned near a like pole of the second permanent magnet to provide a repulsive magnetic force between the first permanent magnet and the second permanent magnet, the engagement member, poles of the first permanent magnet and poles of the second permanent magnet arranged along a single, linear axis;
 wherein the receiving member is configured to be attached to a first system component and the engagement member is configured to be engaged with a second system component perpendicular to the first system component, such that the repulsive magnetic force is configured to dampen relative vibration between the first system component and the second system component;
wherein the plurality of passive vibration dampeners comprises at least six pairs of passive vibration dampeners, wherein each of each pair of passive vibration dampeners comprises a first passive vibration dampener configured to resist movement in a first direction and a second passive vibration dampener configured to resist movement in a second direction opposite the first direction.

25. The elevator system of claim 24, wherein the first component is one of the car or the car frame and the second component is the other of the car or the car frame.

26. The elevator system of claim 24, wherein at least three of the pairs of the passive vibration dampeners are positioned proximate a top of the car, and at least three of the pairs of the passive vibration dampeners are positioned proximate a bottom of the car.

* * * * *